(12) United States Patent
Woodward (10) Patent No.: US 6,702,525 B2
(45) Date of Patent: Mar. 9, 2004

(54) CUTTING TOOL FOR A BAR PEELING OPERATION

(75) Inventor: Bruce C. Woodward, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/795,780

(22) Filed: Feb. 28, 2001

(65) Prior Publication Data

US 2002/0119016 A1 Aug. 29, 2002

(51) Int. Cl.$^7$ ............................. B26D 1/12; B23B 5/20
(52) U.S. Cl. .......................... 407/35; 407/43; 82/130
(58) Field of Search ............................ 407/35, 12, 13, 407/18, 19, 29, 31, 43, 53, 59, 120; 82/1.11, 130, 131

(56) References Cited

U.S. PATENT DOCUMENTS

| 736,799 A | * | 8/1903 | Tindel ........................ 82/130 |
| 4,035,888 A | | 7/1977 | Romagnolo .................. 407/116 |
| 4,805,431 A | * | 2/1989 | Azarevich et al. ............. 72/70 |
| 5,219,114 A | * | 6/1993 | Kajiwara et al. ............ 228/158 |
| 5,246,315 A | | 9/1993 | Hansson et al. ............. 407/114 |
| 5,256,008 A | | 10/1993 | Hansson et al. .............. 407/33 |
| 5,353,668 A | * | 10/1994 | Dahllof ....................... 82/130 |
| 5,363,682 A | * | 11/1994 | Takeda et al. ................ 72/224 |
| 5,564,320 A | * | 10/1996 | Dahllof et al. ................ 82/130 |
| 5,653,152 A | | 8/1997 | Oles et al. .................... 82/1.11 |
| 5,911,548 A | * | 6/1999 | Deiss et al. ................. 409/234 |
| 5,967,705 A | * | 10/1999 | Wermeister ................... 407/39 |
| 6,030,153 A | * | 2/2000 | Votsch et al. ................. 407/36 |

* cited by examiner

Primary Examiner—Henry W. H. Tsai
(74) Attorney, Agent, or Firm—Larry R. Meenan (57) ABSTRACT

A tool for removing material from a workpiece includes a tool body equipped with at least one roughing head and at least one finishing head. The finishing head includes a holder containing at least first and second finishing inserts. The first finishing insert has a cutting edge which extends a distance F1 from the tool body. The second finishing insert has a cutting edge which extends a distance F2 from the tool body. The distance F1 is less than the distance F2.

23 Claims, 7 Drawing Sheets

CUTTING TOOL FOR A BAR PEELING OPERATION

FIELD OF THE INVENTION

The present invention relates in general to tools for removing material from workpieces. More specifically, the invention relates to a cutting tool for a bar peeling operation.

BACKGROUND OF THE INVENTION

Bar peeling is an operation in which a cutting apparatus is used to remove stock from a bar formed of ferrous material or nonferrous material. The stock may be, for example, millscale or cracked material produced during hot rolling of the bar. A typical cutting apparatus has several cutting heads which comprise holders containing cutting inserts.

The cutting edges of the inserts remove the material from the bar in the form of metal coils. Because the coils can interfere with the cutting operation, the inserts are usually formed with a groove or other chipbreaking geometry to break the coils into chips. However, the chips can also interfere with the cutting operation if they are not continuously removed from the vicinity of the cutting apparatus. A typical cutting apparatus produces relatively large chips which are difficult to remove.

One of the most commonly used inserts for bar peeling is a so-called "trigon" insert, as shown and described in U.S. Pat. No. 4,035,888. The trigon insert produces relatively large chips. The insert also requires a relatively large amount of force for bar peeling.

U.S. Pat. Nos. 5,246,315 and 5,256,008 to Hansson et al. describe a cutting tool for a bar peeling operation in which the cutting heads each include a roughing insert and a finishing insert. The finishing insert extends a greater distance from the holder than the roughing insert. The patents do not address the problem of large chips being produced during the bar peeling operation.

In view of the above, it would be desirable to provide a tool for removing material from a workpiece, such as a cutting tool for a bar peeling operation, which is effective to reduce the size of the chips produced during the operation.

SUMMARY OF THE INVENTION

The invention relates to a tool for removing material from a workpiece. The tool includes a tool body equipped with at least one roughing head and at least one finishing head. In one embodiment, the finishing head includes a holder containing at least first and second finishing inserts. The first finishing insert has a cutting edge which extends a distance F1 from the tool body. The second finishing insert has a cutting edge which extends a distance F2 from the tool body. The distance F1 is less than the distance F2.

In another embodiment, the roughing head includes a holder containing at least first and second roughing inserts. The first roughing insert has a cutting edge which extends a distance R1 from the tool body. The second roughing insert has a cutting edge which extends a distance R2 from the tool body. The distance R1 is less than the distance R2.

In a preferred embodiment, the invention relates to a cutting tool adapted for a bar peeling operation. The cutting tool includes a tool body equipped with at least two roughing heads and at least two finishing heads. The roughing heads each include a holder containing at least first and second roughing inserts. The first roughing insert has a cutting edge which extends a distance R1 from the tool body. The second roughing insert has a cutting edge which extends a distance R2 from the tool body. The distance R1 is less than the distance R2 by the amount required to produce small chips or coils. The finishing heads each include a holder containing at least first and second finishing inserts. The first finishing insert has a cutting edge which extends a distance F1 from the tool body. The second finishing insert has a cutting edge which extends a distance F2 from the tool body. The distance F1 is less than the distance F2 by the amount required to produce small chips or coils.

The cutting tool of the invention produces smaller and more compact chips during the bar peeling operation, compared to a typical cutting apparatus, which makes chip removal much easier. The cutting tool produces bars having an excellent surface finish. The cutting tool can also be operated at reduced horsepower and reduced cost.

BRIEF DESCRIPTION OF THE DRAWINGS

While a preferred embodiment of the cutting tool of the invention is illustrated, the particular embodiment shown should not be construed to limit the claims. It is anticipated that various changes and modifications may be made without departing from the scope of this invention.

DETAILED DESCRIPTION OF THE INVENTION

Figure 1:
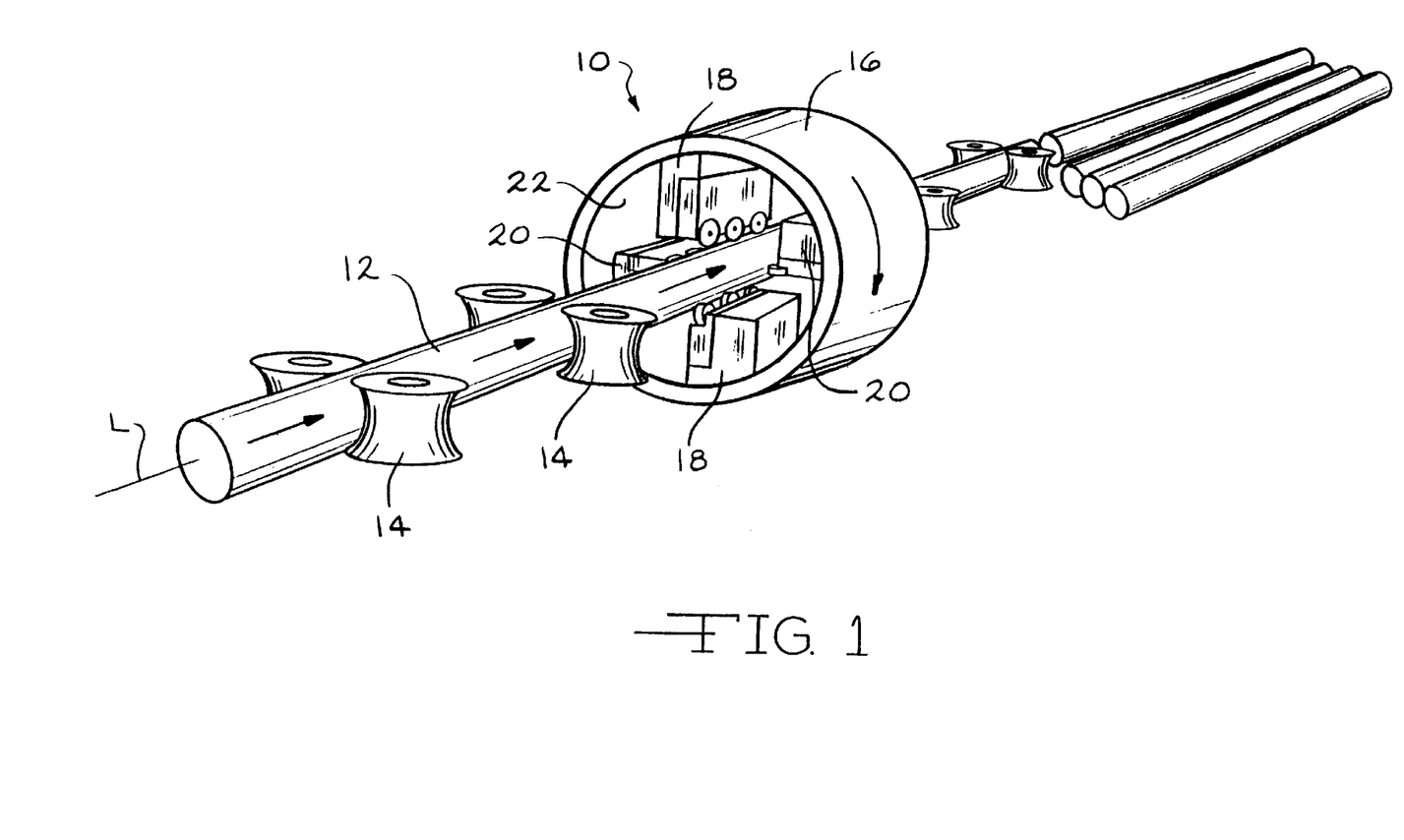
FIG. 1 is a perspective view of a bar peeling operation including a cutting tool according to the invention.

Referring now to the drawings, FIG. 1 shows a bar peeling operation including a rotary cutting tool according to the invention, indicated generally at 10. The cutting tool 10 is part of a larger bar peeling machine (not shown) which provides rotational power to the cutting tool and rotatably supports it. Any suitable bar peeling machine can be used, such as a Hetran peeling machine manufactured by Hetran, Inc., Orwigsburg, Pa. In a particular embodiment, the bar peeling machine is a Hetran Model BT-12 peeling machine which produces a finish diameter on the bar between 2 inches (5.1 centimeters) and 12 inches (30.5 centimeters), and which can operate at 250 horsepower (253.5 metric horsepower).

As shown in FIG. 1, a workpiece 12 is fed by rollers 14 through the center of the rotary cutting tool 10. The workpiece 12 can be fed at any suitable rate depending on the particular workpiece and cutting tool, for example a feed rate between about 10 inches (25.4 centimeters) per minute and about 30 inches (76.2 centimeters) per minute. The illustrated workpiece 12 is a bar, but it could also be a tube.

The bar 12 is formed of stainless steel or other ferrous or nonferrous material. The cutting tool 10 rotates about the bar 12 during the peeling operation to remove material from the outer surface of the bar. Specifically, the cutting tool 10 rotates about an axis L which coincides with the axis of the bar 12.

The illustrated cutting tool 10 includes a generally cylindrical tool body 16. The tool body 16 is equipped with at least one roughing head 18 and at least one finishing head 20, and preferably at least two roughing heads and at least two finishing heads. By "roughing head" is meant a cutting head which produces a relatively rough bar finish, and by "finishing head" is meant a cutting head which produces a relatively smooth bar finish as desired on the final product. In the embodiment shown, the cutting tool 10 includes two opposed roughing heads 18 and two opposed finishing heads 20 mounted on the inner diameter 22 of the tool body 16. The roughing heads 18 and finishing heads 20 extend radially inward from the tool body 16. The roughing heads 18 are located axially forward of the finishing heads 20 (closer to the direction from which the bar 12 is fed).

Figure 2:
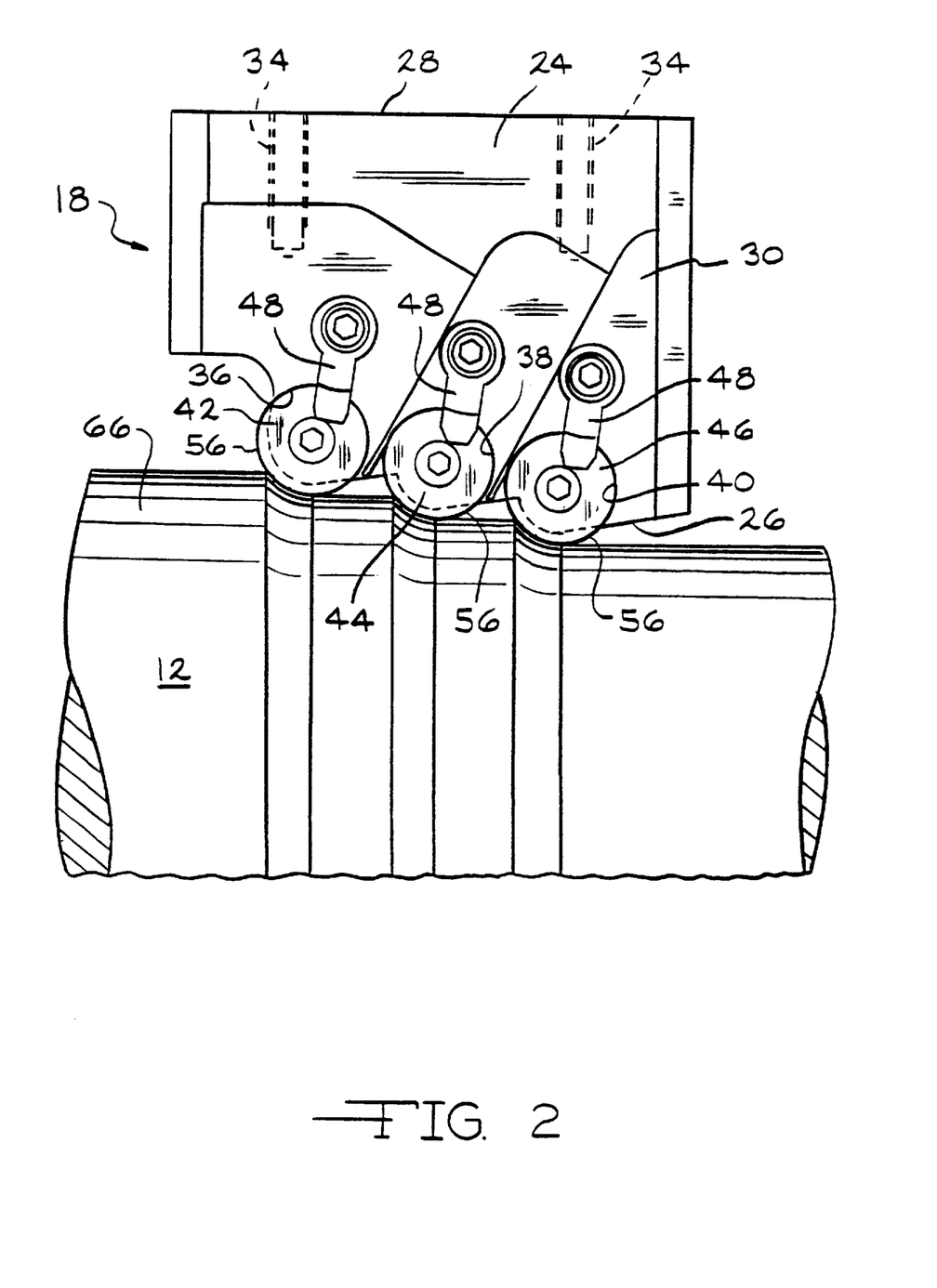
FIG. 2 is a top view of a roughing head of the cutting tool shown rough cutting a bar.
Figure 3:
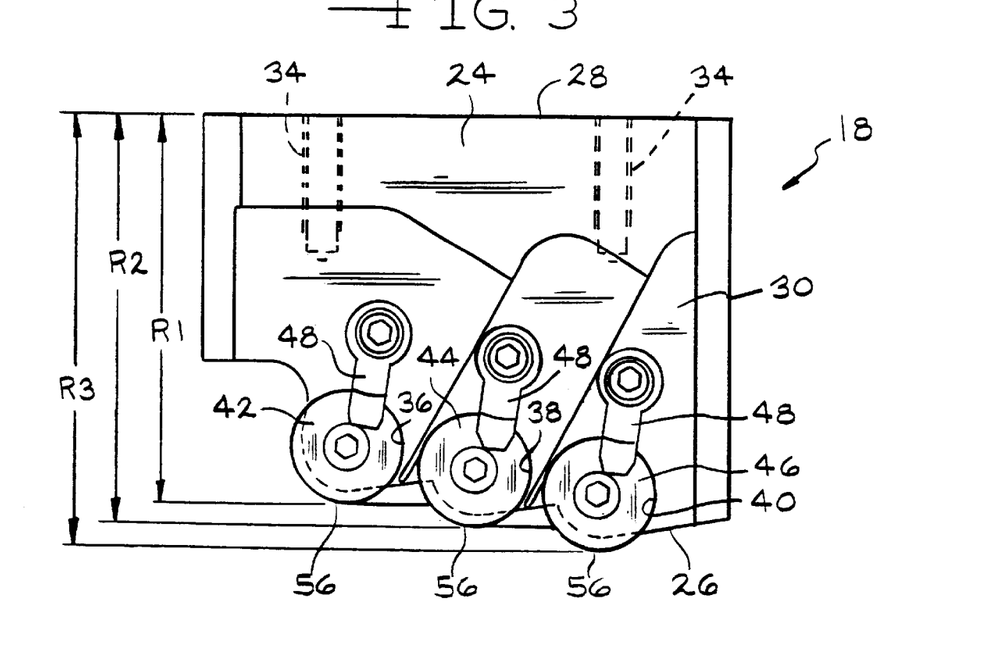
FIG. 3 is a top view of the roughing head.
Figure 4:
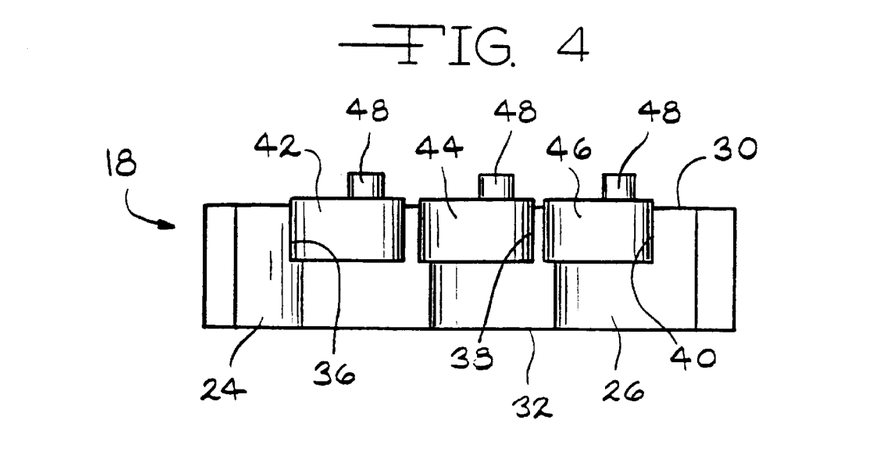
FIG. 4 is a side view of the roughing head.

As shown in FIGS. 2–4, each roughing head 18 includes a holder 24 having an inner side 26, an outer side 28, a top side 30 and a bottom side 32. The holder 24 is usually formed of steel or other relatively strong material. A pair of openings 34 are formed in the outer side 28 of the holder 24. The openings 34 receive fasteners (not shown) for securing the holder 24 to the inner diameter 22 of the tool body 16. The inner side 26 of the holder 24 extends radially inward when the holder is mounted on the tool body 16.

The holder has at least one pocket 36 formed in the edge between the inner side 26 and the top side 30 of the holder 24. Preferably, the holder has at least two pockets 36 and 38, and more preferably at least three pockets 36, 38 and 40. The pockets 36, 38 and 40 are adapted to receive roughing inserts 42, 44 and 46, respectively, for rough cutting the bar 12 during the peeling operation. The holder 24 has clamps 48 to hold the roughing inserts 42, 44 and 46 inside the pockets 36, 38 and 40. The roughing inserts 42, 44 and 46 are spaced at different distances from the outer side 28 of the holder 24, and thus at different distances from the tool body 16, for a purpose described below. In the illustrated embodiment, the roughing inserts 42, 44 and 46 are oriented at a neutral rake, but the inserts could also be tilted at different angles to vary the cutting forces during the bar peeling operation.

The roughing inserts 42, 44 and 46 can be any type of cutting inserts adapted for rough cutting the bar 12. They can be any suitable size and shape. For example, they can be round, octagonal, hexagonal, square, or trigon in shape. Preferably, the roughing head 18 includes at least two round roughing inserts. The roughing inserts can be indexable or non-indexable, and one-sided or two-sided. The roughing inserts can also be formed with any suitable chipbreaking geometry, such as a groove, depression or protrusion. The chipbreaker can be any suitable size and shape.

In the illustrated embodiment, the roughing head 18 includes three round roughing inserts 42, 44 and 46. One of the roughing inserts 42 is shown in more detail in FIGS. 8 and 9. The roughing insert 42 is round in plan view and generally rectangular in cross-section. In a specific embodiment, the roughing insert 42 is between about ¾ inch (1.9 centimeters) and about 1¼ inches (3.2 centimeters) in diameter, and between about ⅜ inch (1.0 centimeter) and about ⅝ inch (1.6 centimeters) thick. The roughing insert 42 includes a top surface 50, a bottom surface 52, and a cylindrical side surface 54. A top cutting edge 56 is defined between the top surface 50 and the side surface 54, and a bottom cutting edge 58 is defined between the bottom surface 52 and the side surface 54. The roughing insert 42 has chipbreaking grooves 60 and 62 around the perimeter of the top and bottom surfaces 50 and 52, respectively. The roughing insert 42 is two-sided and indexable. It has a central aperture 64 for the receipt of a fastener (not shown) to hold it inside the pocket 36, in cooperation with the clamp 48.

Figure 8:
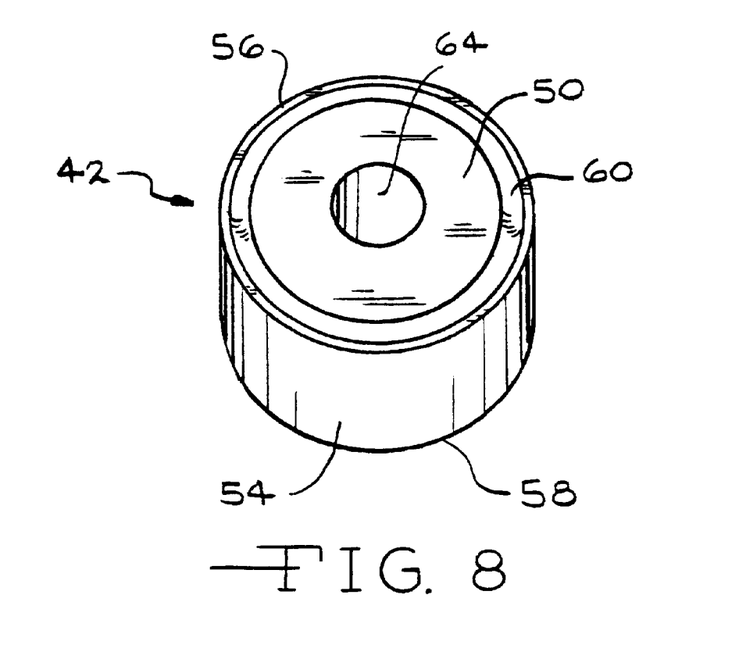
FIG. 8 is a perspective view of a round insert for use in the roughing head and the finishing head of the cutting tool.
Figure 9:
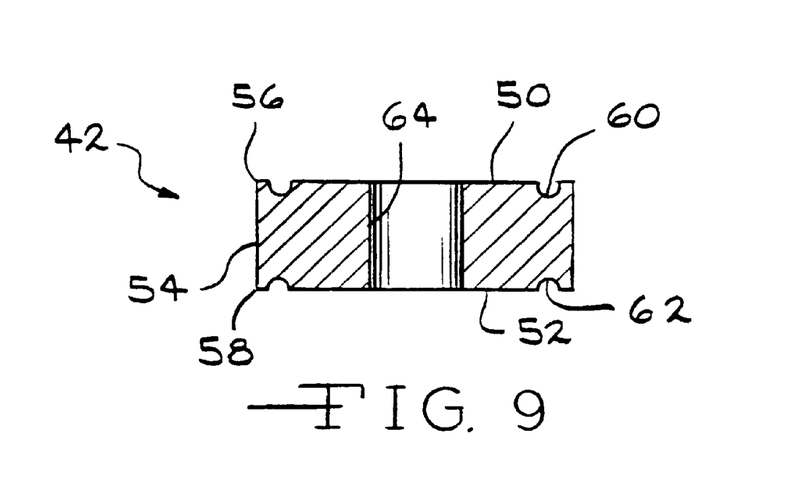
FIG. 9 is a side cross-sectional view of the round insert.

The roughing inserts 42, 44 and 46 are formed of any suitable hard and wear resistant material, such as various carbide materials or ceramic materials. Kennametal Inc., Latrobe, Pa., produces various specialty carbides which are suited for use in the roughing inserts.

As shown in FIG. 2, the roughing head 18 removes material from the outer surface 66 of the bar 12 during the peeling operation. Specifically, as the cutting tool 10 rotates about the bar 12, the top cutting edges 56 of the three roughing inserts 42, 44 and 46 engage the bar 12 to remove material from the outer surface 66. Because the two roughing heads 18 are located axially forward of the two finishing heads 20, the roughing heads cooperate to rough cut the bar 12 before it is fed to the location of the finishing heads for finish cutting.

In the illustrated embodiment, the roughing inserts 42, 44 and 46 are spaced at different distances from the outer side 28 of the holder 24, and thus at different distances from the tool body 16. As shown in FIG. 3, the top cutting edge 56 of the first roughing insert 42 extends a distance R1 from the outer side 28 of the holder 24, the top cutting edge 56 of the second roughing insert 44 extends a distance R2 from the outer side of the holder, and the top cutting edge 56 of the third roughing insert 46 extends a distance R3 from the outer side of the holder. The distance R1 is less than the distance R2, and the distance R2 is less than the distance R3. Preferably, the distance R1 is less than the distance R2, and the distance R2 is less than the distance R3, by the amount required to produce small chips or coils.

Because of the different distances R1, R2 and R3, the top cutting edges 56 of the roughing inserts 42, 44 and 46 are positioned in steps relative to the outer surface 66 of the bar 12, with the cutting edge of the first roughing insert 42 extending the shortest distance into the outer surface, the cutting edge of the second roughing insert 44 extending a greater distance into the outer surface, and the cutting edge of the third roughing insert 46 extending the greatest distance into the outer surface. By removing material from the outer surface 66 of the bar 12 in steps, the roughing head 18 is able to remove a relatively large amount of material while avoiding some of the problems typically associated with such removal. The cutting in steps produces smaller chips than are produced during a typical bar peeling operation. It also requires less force to remove the material, and it results in an improved surface finish.

Figure 5:
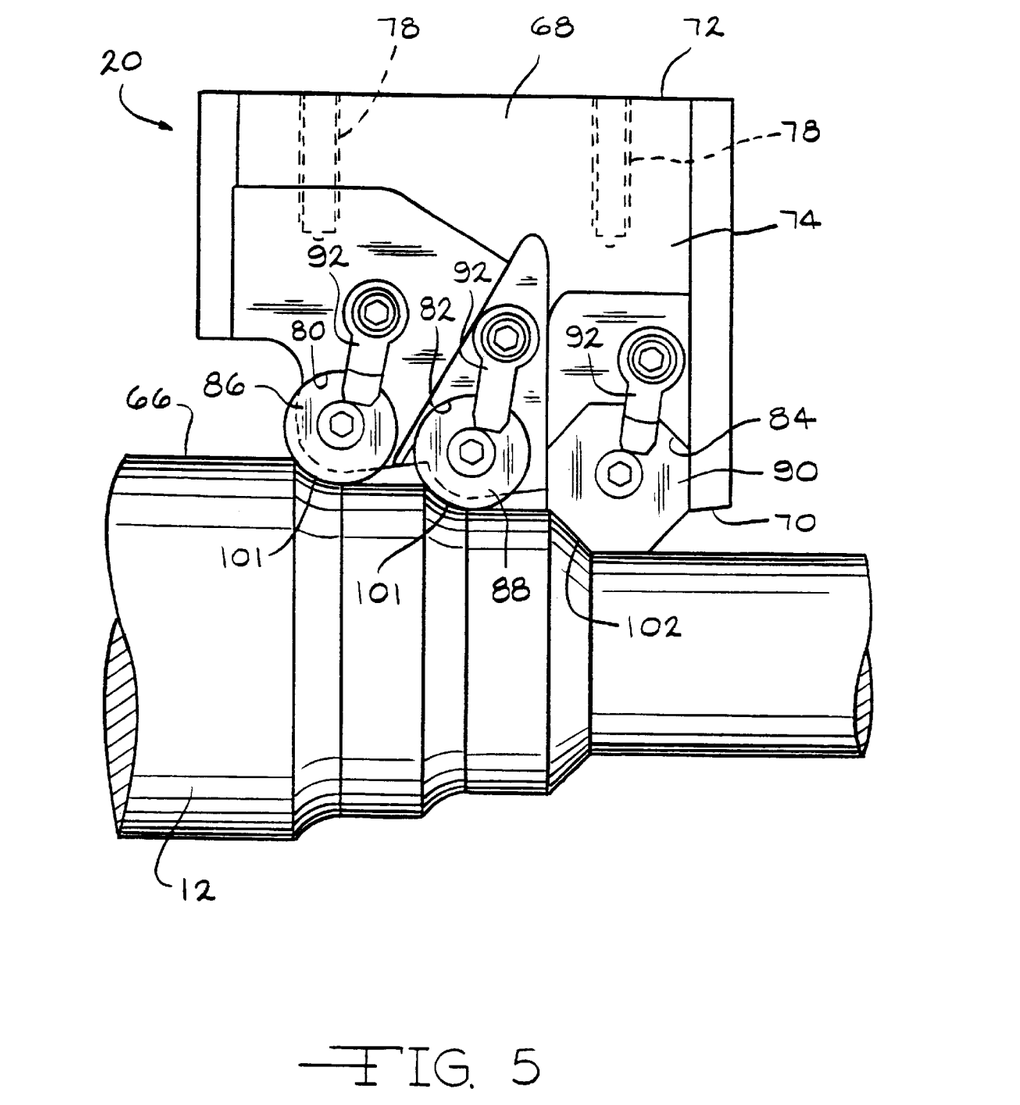
FIG. 5 is a top view of a finishing head of the cutting tool shown finish cutting the bar.
Figure 6:
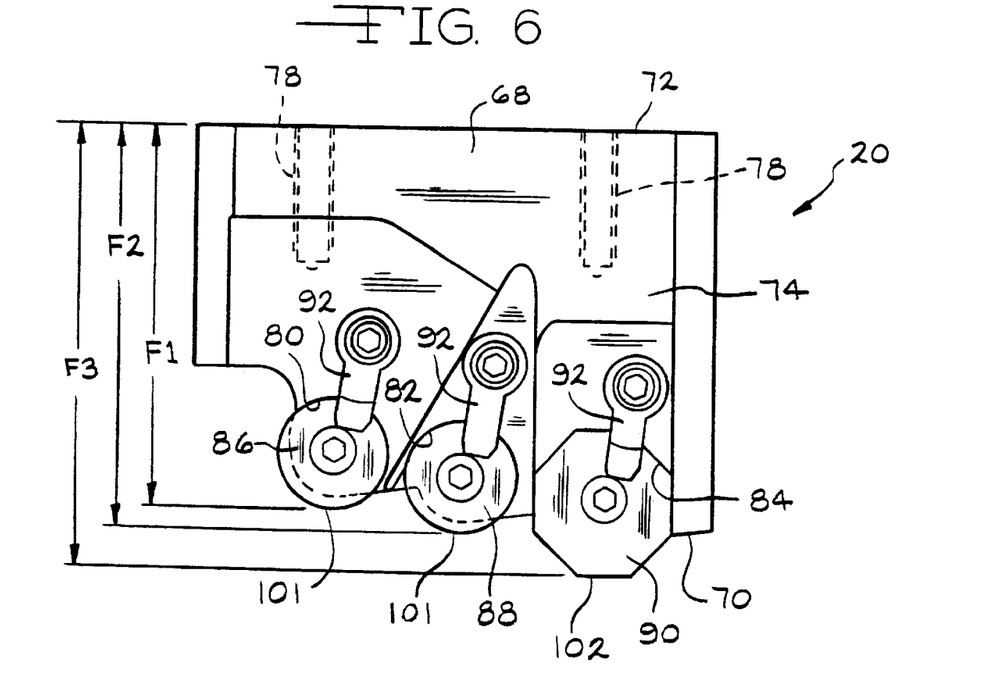
FIG. 6 is a top view of the finishing head.
Figure 7:
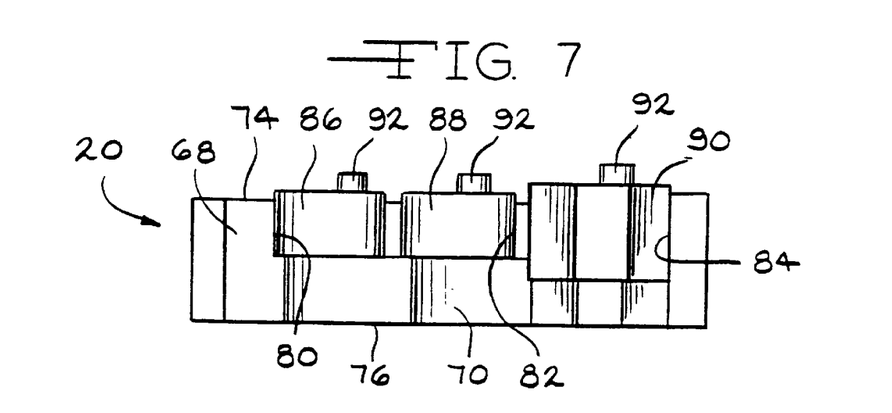
FIG. 7 is a side view of the finishing head.

As shown in FIGS. 5–7, each finishing head 20 includes a holder 68 having an inner side 70, an outer side 72, a top side 74 and a bottom side 76. A pair of openings 78 are formed in the outer side 72 of the holder 68. The openings 78 receive fasteners (not shown) for securing the holder 68 to the inner diameter 22 of the tool body 16.

The holder 68 has at least one pocket 80 formed in the edge between the inner side 70 and the top side 74 of the holder. Preferably, the holder 68 has at least two pockets 80 and 82, and more preferably at least three pockets 80, 82 and 84. The pockets 80, 82 and 84 are adapted to receive finishing inserts 86, 88 and 90, respectively, for finish cutting the bar 12 during the peeling operation. The holder 68 has clamps 92 to hold the finishing inserts 86, 88 and 90 inside the pockets 80, 82 and 84. The finishing inserts 86, 88 and 90 are spaced at different distances from the outer side 72 of the holder 68, and thus at different distances from the tool body 16.

The finishing inserts 86, 88 and 90 can be any type of cutting inserts adapted for finish cutting the bar 12. They can be any suitable size and shape. Preferably, the finishing head 20 includes at least one round finishing insert and at least one octagonal finishing insert. The finishing inserts can be formed with any suitable chipbreaking geometry, of any suitable size and shape.

In the illustrated embodiment, the finishing head 20 includes two round finishing inserts 86 and 88 and one octagonal finishing insert 90. The round finishing inserts 86 and 88 may be similar to the round roughing insert 42 illustrated in FIGS. 8 and 9. The octagonal finishing insert 90 is shown in more detail in FIGS. 10 and 11. The octagonal finishing insert 90 is octagonal in plan view and generally rectangular in cross-section. In a specific embodiment, the octagonal finishing insert 90 is between about ½ inch (1.3 centimeters) and about 1¼ inches (3.2 centimeters) in diameter, and between about ⅛ inch (0.3 centimeter) and about ⅝ inch (1.6 centimeters) thick. The octagonal finishing insert 90 includes a top surface 94, a bottom surface 96, and a side surface 98 comprised of eight side portions 100 which together form an octagon. A top cutting edge 102 is defined between the top surface 94 and the side surface 98, and a bottom cutting edge 104 is defined between the bottom surface 96 and the side surface 98. The octagonal finishing insert 90 has chipbreaking recesses 106 and 108 around the perimeter of the top and bottom surfaces 94 and 96, respectively. The octagonal finishing insert 90 is two-sided and indexable. It has a central aperture 110 for the receipt of a fastener (not shown) to hold it inside the pocket 84, in cooperation with the clamp 92.

Figure 10:
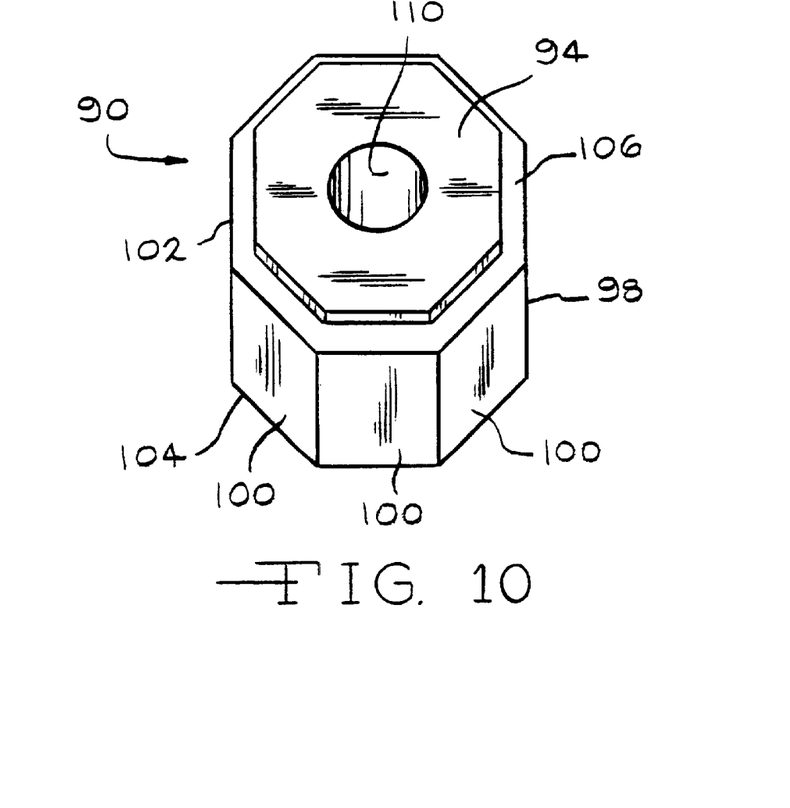
FIG. 10 is a perspective view of an octagonal insert for use in the finishing head of the cutting tool.
Figure 11:
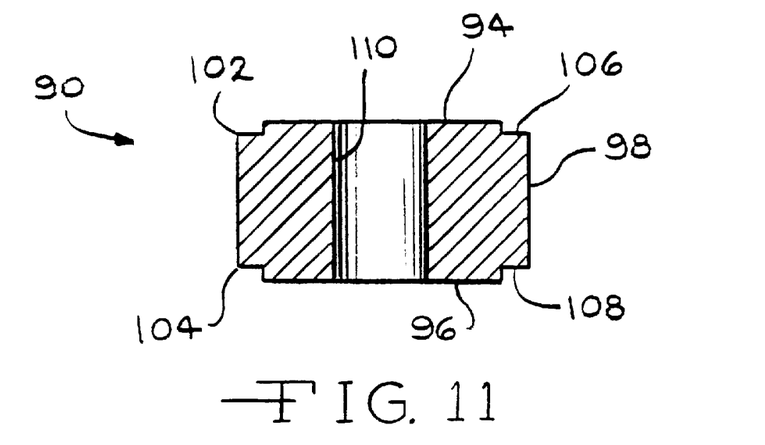
FIG. 11 is a side cross-sectional view of the octagonal insert.

The finishing inserts 86, 88 and 90 are formed of any suitable hard and wear resistant material, such as various carbide materials or ceramic materials.

As shown in FIG. 5, the finishing head 20 removes material from the outer surface 66 of the bar 12 during the peeling operation. Specifically, as the cutting tool 10 rotates about the bar 12, the top cutting edges 101 of the round finishing inserts 86 and 88, and the top cutting edge 102 of the octagonal finishing insert 90, engage the bar 12 to remove material from the outer surface 66.

In the illustrated embodiment, the finishing inserts 86, 88 and 90 are spaced at different distances from the outer side 72 of the holder 68, and thus at different distances from the tool body 16. As shown in FIG. 6, the top cutting edge 101 of the first finishing insert 86 extends a distance F1 from the outer side 72 of the holder 68, the top cutting edge 101 of the second finishing insert 88 extends a distance F2 from the outer side of the holder, and the top cutting edge 102 of the third finishing insert 90 extends a distance F3 from the outer side of the holder. The distance F1 is less than the distance F2, and the distance F2 is less than the distance F3. Preferably, the distance F1 is less than the distance F2, and the distance F2 is less than the distance F3, by the amount required to produce small chips or coils.

Because of the different distances F1, F2 and F3, the top cutting edges 102 of the finishing inserts 86, 88 and 90 are positioned in steps relative to the outer surface 66 of the bar 12, with the cutting edge of the first finishing insert extending the shortest distance into the outer surface, the cutting edge of the second finishing insert extending a greater distance into the outer surface, and the cutting edge of the third finishing insert extending the greatest distance into the outer surface. By removing material from the outer surface 66 of the bar 12 in steps, the finishing head 20 provides advantages such as smaller chips produced, less force required, and improved surface finish.

Having described specific embodiments, the invention may be otherwise embodied within the scope of the appended claims. For example, it is contemplated that the tool of the invention could be used in a drilling or boring operation, instead of a peeling operation. In a preferred embodiment, the cutting tool is used in any peeling operation in which the tool rotates around a workpiece. Alternatively, the cutting tool could remain stationary while the workpiece rotates. While the cutting tool has been illustrated with both the roughing heads and the finishing heads having stepped cutting inserts, it will be appreciated that a cutting tool according to the invention could also be constructed with only the roughing heads or only the finishing heads having stepped cutting inserts.

What is claimed is:

1. A tool for removing material from a workpiece, the tool comprising a tool body having an inner diameter through which a workpiece can be guided and at least one roughing head and at least one finishing head, the finishing head producing a smoother workpiece finish than the roughing head, the finishing head comprising a holder containing at least first and second finishing inserts, the first finishing insert having a cutting edge which extends a first distance (F1) from a reference in the tool body, the second finishing insert having a cutting edge which extends a second distance (F2) from the reference in the tool body, the first distance (F1) being less than the second distance (F2).

2. A tool according to claim 1 wherein the first distance (F1) is less than the second distance (F2) by the amount required to produce small chips or coils.

3. A tool according to claim 1 wherein the holder of the finishing head contains at least a third finishing insert, the third finishing insert having a cutting edge which extends a third distance (F3) from the reference in the tool body, the second distance (F2) being less than the third distance (F3).

4. A tool according to claim 3 wherein the first distance (F1) is less than the second distance (F2), and the second distance (F2) is less than the third distance (F3), by the amount required to produce small chips or coils.

5. A tool according to claim 1 wherein the tool body is equipped with at least two of the finishing heads.

6. A tool according to claim 1 wherein the tool is a cutting tool adapted for a bar peeling operation.

7. A tool for removing material from a workpiece, the tool comprising a tool body having an inner diameter through which a workpiece can be guided and at least one roughing head and at least one finishing head, the finishing head producing a smoother workpiece finish than the roughing head, the roughing head comprising a holder containing at least first and second roughing inserts, the first roughing insert having a cutting edge which extends a first distance (R1) from a reference in the tool body, the second roughing insert having a cutting edge which extends a second distance (R2) from the reference in the tool body, the first distance (R1) being less than the second distance (R2).

8. A tool according to claim 7 wherein the distance first (R1) is less than the second distance (R2) by the amount required to produce small chips or coils.

9. A tool according to claim 7 wherein the holder of the roughing head contains at least a third roughing insert, the third roughing insert having a cutting edge which extends a third distance (R3) from the reference in the tool body, the second distance (R2) being less than the third distance (R3).

10. A tool according to claim 9 wherein the first distance (R1) is less than the second distance (R2), and the second distance (R2) is less than the third distance (R3), by the amount required to produce small chips or coils.

11. A tool according to claim 7 wherein the tool body is equipped with at least two of the roughing heads.

12. A tool according to claim 7 wherein the tool is a cutting tool adapted for a bar peeling operation.

13. A cutting tool adapted for a bar peeling operation, the cutting tool comprising a tool body having an inner diameter through which a bar can be guided and at least two roughing heads and at least two finishing heads, the finishing heads producing a smoother bar finish than the roughing heads, the roughing heads each comprising a holder containing at least first and second roughing inserts, the first roughing insert having a cutting edge which extends a first distance (R1) from a reference in the tool body, the second roughing insert having a cutting edge which extends a second distance (R2) from the reference in the tool body, the first distance (R1) being less than the second distance (R2) by the amount required to produce small chips or coils, and the finishing heads each comprising a holder containing at least first and second finishing inserts, the first finishing insert having a cutting edge which extends a fourth distance (F1) from the reference in the tool body, the second finishing insert having a cutting edge which extends a fifth distance (F2) from the reference in the tool body, the fourth distance (F1) being less than the fifth distance (P2) by the amount required to produce small chips or coils.

14. A cutting tool according to claim 13 wherein the holder of each of the finishing heads contains at least a third finishing insert, the third finishing insert having a cutting edge which extends a sixth distance (P3) from the reference in the tool body, the fifth distance (P2) being less than the sixth distance (P3).

15. A cutting tool according to claim 14 wherein the fourth distance (F1) is less than the fifth distance (F2), and the fifth distance (F2) is less than the sixth distance (F3), by the amount required to produce small chips or coils.

16. A cutting tool according to claim 13 wherein the holder of each of the roughing heads contains at least a third roughing insert, the third roughing insert having a cutting edge which extends a third distance (R3) from the reference in the tool body, the second distance (R2) being less than the third distance (R3).

17. A cutting tool according to claim 16 wherein the first distance (R1) is less than the second distance (R2), and the second distance (R2) is less than the third distance (R3), by the amount required to produce small chips or coils.

18. A cutting tool according to claim 13 wherein the holder of each of the finishing heads contains at least one round finishing insert and at least one octagonal finishing insert.

19. A cutting tool according to claim 13 wherein the holder of each of the roughing heads contains at least two round roughing inserts.

20. A cutting tool according to claim 13 wherein the holder of each of the roughing heads contains at least two round roughing inserts, and the holder of each of the finishing heads contains at least one round finishing insert and at least one octagonal finishing insert.

21. A tool for removing material from a workpiece, the tool comprising a tool body having an inner diameter through which a workpiece can be guided and at least one roughing head and at least one finishing head, the roughing head being located axially forward of the finishing head, the finishing head producing a smoother workpiece finish than the roughing head, the finishing head comprising a holder containing at least first and second finishing inserts, the first finishing insert having a cutting edge which extends a first distance (F1) from a reference in the tool body, the second finishing insert having a cutting edge which extends a second distance (F2) from the reference in the tool body, the first distance (F1) being less than the second distance (F2) to produce small chips or coils.

22. A tool for removing material from a workpiece, the tool comprising a tool body having an inner diameter through which a workpiece can be guided and at least one roughing head and at least one finishing head, the roughing head being located axially forward of the finishing head, the finishing head producing a smoother workpiece finish than the roughing head, the roughing head comprising a holder containing at least first and second roughing inserts, the first roughing insert having a cutting edge which extends a first distance (R1) from a reference in the tool body, the second roughing insert having a cutting edge which extends a second distance (R2) from the reference in the tool body, the first distance (R1) being less than the second distance (R2) to produce small chips or coils.

23. A cutting tool adapted for a bar peeling operation, the cutting tool comprising a tool body having an inner diameter through which a bar can be guided and at least two roughing heads and at least two finishing heads, the roughing head being located axially forward of the finishing head, the finishing heads producing a smoother bar finish than the roughing heads, the roughing heads each comprising a holder containing at least first and second roughing inserts, the first roughing insert having a cutting edge which extends a first distance (R1) from a reference in the tool body, the second roughing insert having a cutting edge which extends a second distance (R2) from the reference in the tool body, the first distance (R1) being less than the second distance (R2) by the amount required to produce small chips or coils, and the finishing heads each comprising a holder containing at least first and second finishing inserts, the first finishing insert having a cutting edge which extends a third distance (F1) from the reference in the tool body, the second finishing insert having a cutting edge which extends a fourth distance (F2) from the reference in the tool body, the third distance (F1) being less than the fourth distance (P2) by the amount required to produce small chips or coils.

* * * * *